United States Patent [19]

Markiewicz et al.

[11] Patent Number: 5,322,160
[45] Date of Patent: Jun. 21, 1994

[54] CONVEYOR BELT CHANGEOVER DEVICE

[75] Inventors: Lawrence Markiewicz, Edison; James Curcio, South Plainfield, both of N.J.

[73] Assignee: L'Oreal, France

[21] Appl. No.: 990,454

[22] Filed: Dec. 15, 1992

[51] Int. Cl.⁵ ............................................ B65G 21/20
[52] U.S. Cl. ................................. 198/836.3; 198/836.1
[58] Field of Search ............... 198/836.1, 836.3, 861.1

[56] References Cited

U.S. PATENT DOCUMENTS

| | | | |
|---|---|---|---|
| 3,647,051 | 3/1972 | Didas | 198/836.3 |
| 3,776,350 | 12/1973 | Tice | 198/836.3 |
| 4,470,499 | 9/1984 | Sijbrandij | 198/836.3 |
| 4,502,594 | 3/1985 | Sijbrandij | 198/836.3 |
| 4,932,517 | 6/1990 | Johnson | 198/836.3 X |

FOREIGN PATENT DOCUMENTS

| | | | |
|---|---|---|---|
| 2808270 | 8/1978 | Fed. Rep. of Germany | 198/836.3 |
| 3445426 | 6/1986 | Fed. Rep. of Germany | 198/836.3 |
| 2544292 | 10/1984 | France | 198/836.3 |
| 0087526 | 2/1958 | Netherlands | 198/836.3 |

*Primary Examiner*—James R. Bidwell
*Attorney, Agent, or Firm*—Brumbaugh, Graves, Donohue & Raymond

[57] ABSTRACT

A spring-loaded device is disclosed which allows for quick, easy and accurate adjustment of the horizontal distance between the side-rails of a conveyor belt or the height of the side-rails above the conveyor belt. In one embodiment, the adjustment device is attached to the side rails by a horizontal shaft, which supports, at its other end, a perpendicular setting pole. The upper end of the setting pole can engage in any one of a plurality of recesses of varying depth situated around the perimeter of a precalibrated, rotating disc adjacent to the setting pole. The depth of each recess into which the setting pole is placed corresponds to a certain distance of movement of one of the side rails. A compression spring surrounding that portion of the shaft collar adjacent to the side rails has sufficient tension to ensure that the setting pole remains in the recess at any setting.

20 Claims, 2 Drawing Sheets

CONVEYOR BELT CHANGEOVER DEVICE

FIELD OF THE INVENTION

The present invention relates to a universal device for adjusting the rails of a conveyor belt assembly used for carrying any type of article, including bottles, containers and the like, and more particularly to a spring-loaded device which allows for the quick, easy and accurate vertical and horizontal adjustment of the side-rails of a conveyor belt.

BACKGROUND OF THE INVENTION

Until the present invention, adjusting the side rails of a conveyor belt assembly, both horizontally to vary the distance between the rails and vertically to vary the height of the rails, was a laborious task performed manually. Clamps, screws and bolts which held the rails in place at intervals along the conveyor belt had to be loosened by a wrench, pliers, and/or screwdriver, and then similarly tightened subsequent to changing the distance between the side-rail units. This procedure often had to be performed several times to achieve the appropriate original positive setting position for the rails in relation to the width and height of the items being moved along the conveyor belt. Typically, for each different sized bottle, e.g. 1 inch, 2 inches, 3 inches, etc., adjustments have to be made to the rails of the conveyor belt. The repeated manual adjustment of the rails without the benefit of the present invention was tedious and time-consuming due to the clamps, screws and bolts holding the rails in place.

Frequently, running adjustments, necessary after the original setting is chosen and the system is put into operation, were too often performed several times on a "trial and error" basis, requiring testing to determine if the correct adjustment had been made. Moreover, bottles are commonly wedged at the infeed station of the conveyor belt, causing congestion and often requiring adjustment to the rails at that site. In addition, if a bottle falls from the upright position causing a domino effect with bottles falling at different angles, pushing outward against the rails, or even protruding above, below or between the rails, obstruction and congestion may occur at any site on the belt, requiring another adjustment.

In these instances, the operator often has to interrupt the processing of the items being transported, adjust the rails to allow for the straightening of items moving along the conveyor, and lastly, by the laborious process of repeated "trial and error" manual adjustment to the rails, attempt to reset the side-rails exactly as they were prior to the interruption. In some cases, the rails themselves buckled or became distorted requiring again the interruption of processing and "trial and error" adjustment to the rails. The present invention overcomes these above-described problems existing in the field.

Specifically, the quick changeover device of the present invention, allows for quick, easy and stable adjustment to the rails. The device is further specifically designed to maintain its original setting and absorb the shock of a major jam-up that often previously required the re-straightening or remounting of the rails.

Vertical adjustment of the rails may also be necessary to meet the changing requirements of bottle heights. Insufficient height of the rails in relation to the height of the bottles results in less stability and support, contributing to the occurrence of blockages due to overturned bottles. To decrease the occurrence of these problems, vertical as well as horizontal adjustment of the rails may be necessary.

Thus, an object of this invention is to provide a cost-effective mechanism for adjusting the side-rail units of a conveyor-belt assembly by providing a device which allows for the efficient and speedy adjustment of the side-rails units.

Another object of this invention is to provide means whereby the rails of a conveyor belt can be set easily at pre-determined positions by simply rotating a knob or dial to select, with a setting pole, a desired position on a calibrated disc corresponding to the desired width between the side rails.

It is a further object of the invention to eliminate the use of hand-tools to adjust the rails and the required "trial and error" approach to achieve a desired setting of the side-rails, significantly decreasing "change-over" time.

Yet another object of this invention is to allow for the easy and nonuniform adjustment of the distance between the rails of a conveyor belt at various points along the conveyor belt line. For example, it may be preferable for the infeed section to be set at a tapered angle, allowing the bottles greater room and flexibility, whereas down-line, it may be preferable to lessen the distance between the rails. The present invention renders these features more practicable than ever before.

SUMMARY OF THE INVENTION

In accordance with the invention, a device for adjusting the rails of a conveyor belt assembly includes two side-rail units, one on each side of a conveyor belt. Preferably, each side-rail unit is movable in relation to the other so that the distance between them can be varied to accommodate containers of different sizes.

In accordance with the invention, a support block is placed at a preselected distance from the outside surface of the side-rail off the conveyor belt. The support block preferably is a rectangular block with a hollowed-out passage containing a press-fitted linear bearing throughout its course and opening on its two opposing surfaces, in such a way that the passage is perpendicular to and extending towards the side-rail unit. The block is held by a vertical rod, having its lower end attached to a base which is secured with the conveyor belt unit and its upper end movably attached to the block. The rod is inserted into a slot at the base of the block, which slot preferably contains a bushing creating a slight pivot point at which rotation can occur.

A shaft passes through the hollowed-out passage in the block, specifically sliding through the linear bearing. The shaft extends on both sides of the block, with one end extending to fixedly attach to the side-rail unit and the other end extending beyond the outer surface of the support block. A compression spring surrounds that portion of the shaft extending from the block to the side-rail unit.

In accordance with the invention, a precalibrated disc has recesses of different depths (corresponding to various bottle sizes) at intervals around its perimeter, and a setting pole is situated in any recess according to the desired distance between the side-rail units; the location of the setting pole in the selected recess determines the distance between one of the side rails and the center line of the conveyor, as follows.

The disc is movably connected to the upper surface of the block by a vertical pin so the disc can be rotated (preferably by a knob) to the setting or recess desired. The setting pole is perpendicular and fixed at one end to that portion of the shaft extending beyond the outer surface of the block. Because the shaft is slidably engaged through the block and attaches to the rails, by moving the setting pole to a selected recess the rails may be adjusted and set to a distance corresponding to the selected recess. The spring exerts force on the side-rail unit, ensuring that the free end of the setting pole remains in the selected recess.

Preferably, each side-rail unit is movable in a direction perpendicular to the conveyer belt so that the height of the side-rail unit in relation to the conveyer belt can be varied. In this embodiment, the vertical rod contains pre-selected receptacles or passages each of which corresponds to a particular height of the side rail units, which units may be vertically adjusted and set by moving the vertical rod to the desired location and placing a setting shaft or knob through one of the receptacles in the rod.

BRIEF DESCRIPTION OF THE DRAWINGS

The objects, features and advantages of the present invention will become apparent from the following detailed description of an exemplary embodiment thereof in conjunction with the accompanying drawings in which.

Figure 1:
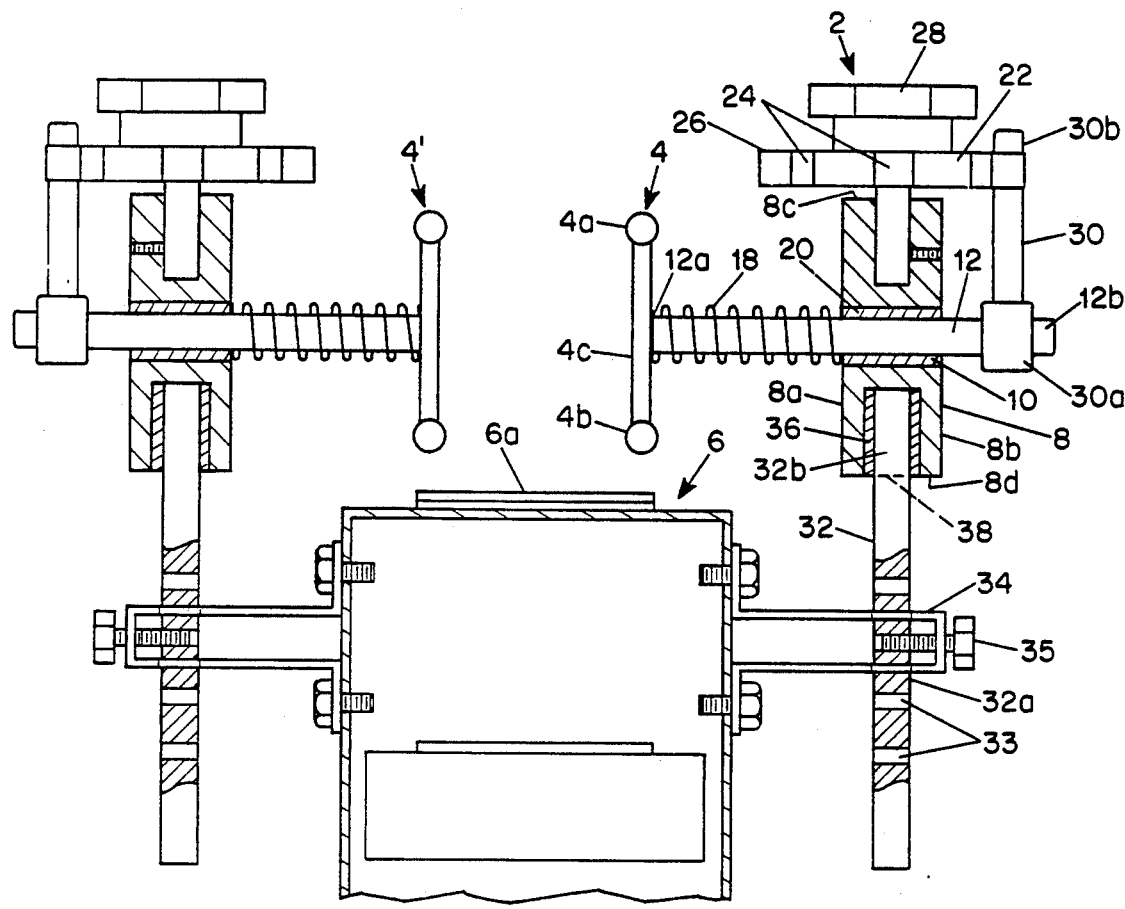
FIG. 1 is a cross-sectional view of a conveyor belt and side-rail assembly unit in accordance with the invention.

Throughout the figures, the same reference numerals are used to denote like elements, components or portions of the illustrated embodiment. Moreover, while the subject invention will now be described in detail with reference to the figures, it is done so only in connection with a preferred embodiment. It is intended that changes and modifications can be made to the described embodiment without departing from the true scope and spirit of the subject invention as defined by the claims.

DETAILED DESCRIPTION OF THE INVENTION

Referring to FIG. 1, there is shown a preferred embodiment of a quick changeover device 2 for adjusting side-rails 4 and 4' of a conveyor belt assembly 6 in accordance with the invention, and specifically for adjusting the distance between side rails 4 and 4'. The device preferably includes two side-rail units 4 and 4', one on each side of the conveyor belt 6a, constructed from a material that provides sufficient flexibility to allow the side-rails to resume their normal shape after a force that has caused some bowing of the side-rails has been removed. This reduces the likelihood of permanent distortion of the rails 4 and 4'. To this end the material used may be plastic, rubber, aluminum, wood or metal, including metal alloys. Each of the side-rail units 4 and 4' may be one solid piece or a single rail or may comprise, as shown, at least two separate rails 4a and 4b connected by a connector-piece 4c to which the mechanism for adjusting the side-rail units may attach.

A solid wooden, metal or stainless steel support block 8 is placed at a preselected distance from the outside surface of the side-rail unit 4 and 4' off the conveyor belt. The distance selected between the block 8 and the side-rail unit 4 and 4' preferably is such that at the widest setting of the rails, i.e., the maximum required distance between side-rails 4 and 4', there is enough tension in the compression spring to force the side-rail unit 4 towards unit 4'.

The support block 8 has a hollowed-out passage 10 which is essentially perpendicular to the side rail unit 4. The passage 10 travels throughout the block's course, originating on one surface 8a and terminating on the opposing surface 8b. The passage has a linear bearing 20 press-fitted throughout the length of the passage 10 to allow for sliding therein by e.g., a wooden, metal or stainless steel shaft 12 passing therethrough. One end 12a of the shaft 12 attaches to the side-rail unit 4 and the opposite end 12b of the shaft 12 protrudes through the opening at the surface 8b of the block 8 furthest from the side-rail unit 4.

Preferably, compression spring 18 surrounds that portion of the shaft 12 extending from the block to the side-rail unit 4. The spring 18, which is not attached at either end, exerts inward pressure, forcing the two side-rail units 4 and 4' towards each other, thus maintaining the side-rails in the selected position.

Figure 2:
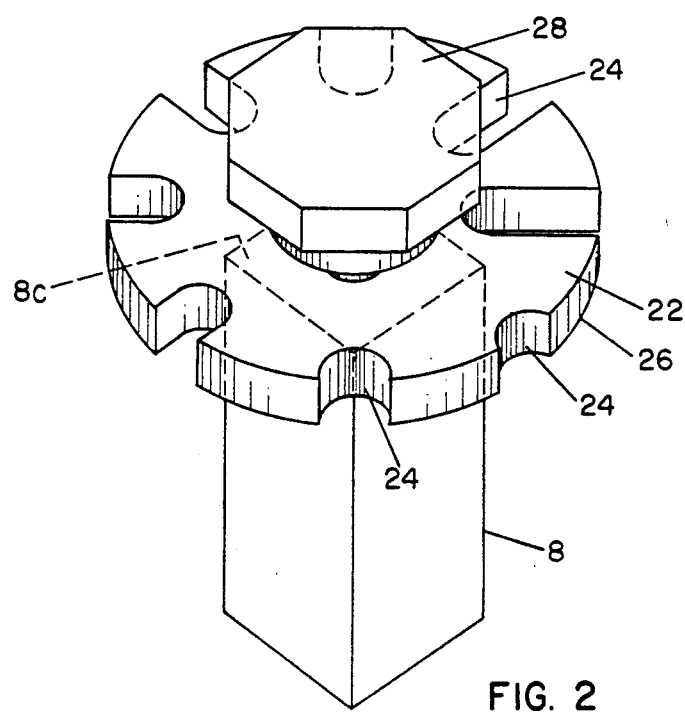
FIG. 2 is an exploded top perspective view of the precalibrated disc and rotating means in accordance with the invention.

In accordance with the invention, precalibrated disc 22, preferably controlled by knob 28, seen more clearly in FIG. 2, is attached to the upper surface 8c of the block 8 by preferably a pin. The disc 22 accommodates recesses 24 of various depths (corresponding to the various shapes and sizes of the bottles or other items to be transported on the belt) at intervals around its perimeter 26. The disc is attached in a manner to allow one to rotate the disc for aligning a selected recess with a setting pole 30, now described.

Figure 3:
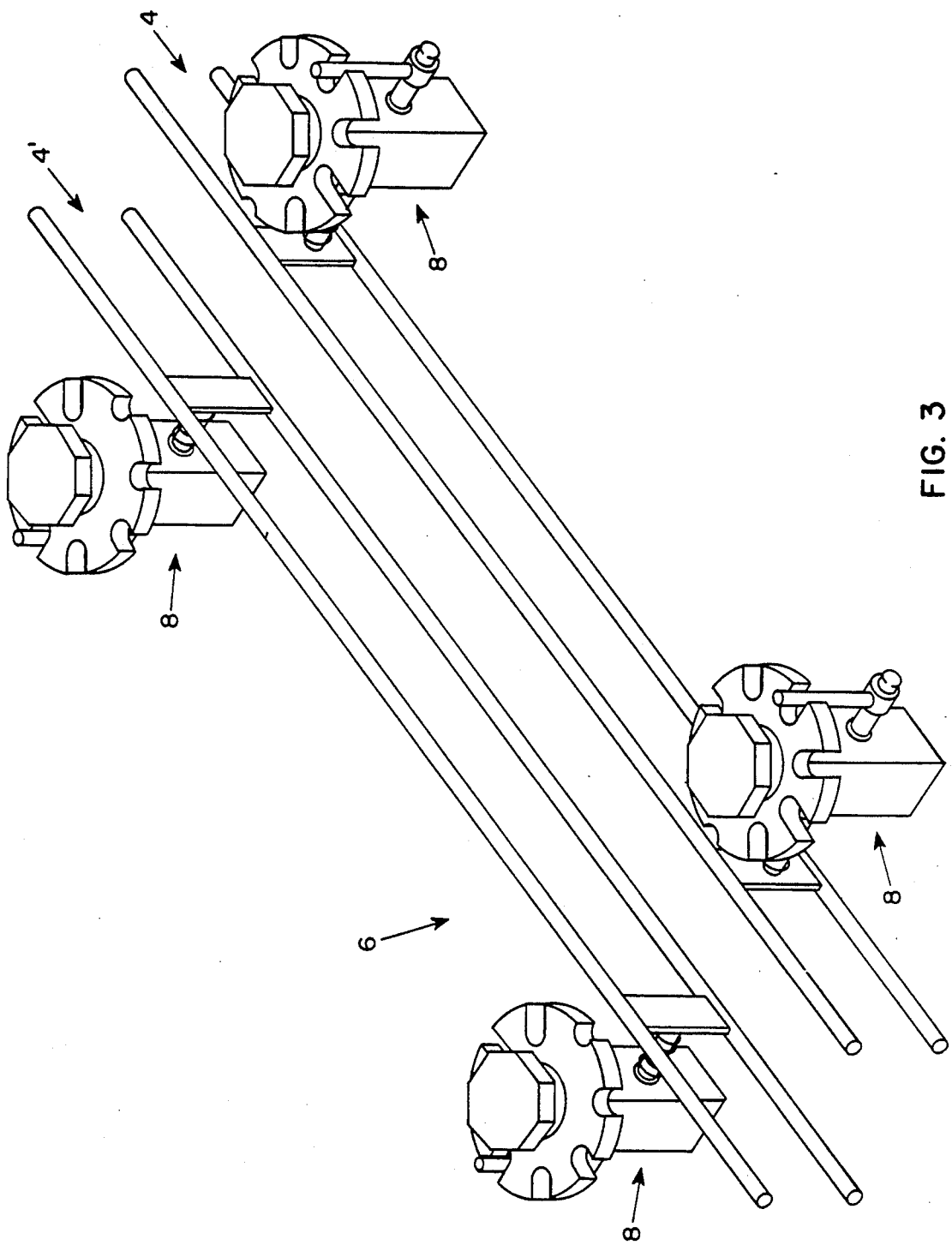
FIG. 3 is an oblique top perspective view of a conveyor-belt and side-rail assembly unit in accordance with the invention.

The lower end of the wooden, metal or stainless steel setting pole 30 is affixed to the free end of the shaft 12 by shaft collar 30a so that the setting pole 30 is essentially perpendicular to the shaft 12. By this fixed connection, movement of the setting pole adjusts the rail 4 and the distance between that rail 4 and the center line of the conveyor, and consequently, the distance between rails 4 and 4', as can be seen in FIG. 3 as well as FIG. 1. The free upper end 30b of the setting pole 30 is placed into one of the recesses 24 of the precalibrated disc 22 depending upon the size of the bottles being transported on the conveyor. For example, for a 12 oz. size bottle, the setting pole will be pulled from the disc so as to allow adjustment thereof by rotation of the knob. In this manner, the pole may then be quickly and easily placed into the recess associated with the 12 oz. bottle. Preferably, each recess is designated with a numeral representing different sized and shaped bottles that will be transported on the conveyor. The tension of the spring 18 against the side-rail unit 4 maintains the position of the setting pole 30 within the recess 24, pushing it inward towards the conveyor. The spring 18 is sufficiently elongated to exert pressure even when the setting pole is engaged in the shallowest recess 24 of the disc 22.

A wooden or metal vertical rod 32 preferably holds and connects the block 8 to the conveyor belt unit 6. The lower portion 32a of the rod 32 is adjustably affixed to the conveyor belt unit 6 by a clamp bracket 34. Vertical adjustment of the side rail unit is achieved by movement of the vertical rod 32, which is provided with one or more receptacles or holes, for receiving a threaded or unthreaded knob 35. Each setting corresponds to a particular height of the rail. The height of the rails may be locked at a particular setting by placing the knob 35 in the hole corresponding to the height desired at pre-selected settings (preferably ⅛" apart).

Referring back to horizontal adjustment of the rails, the upper portion 32b of the vertical rod 32 preferably enters a slot at the lower surface 8d of the block 8. Bushing 36, constructed of brass or of any other suitable material, is preferably press-fitted at the base of the block where the rod 32 enters the block 8, creating a slight pivot point 38. This pivot point 38 allows for free rotation of the block 8 when horizontal movement of the rails occurs. The ability to freely rotate in this way is especially important when adjacent sections of the side-rail unit 4 are not adjusted simultaneously. For example, in the absence of the bushing 36 it would be difficult to have a setting at the infeed area greater than down-line, without creating a dragging effect. The combination of a linear bearing 20 in the hollowed out passage 10 and a bushing 36 at the base 8d of the block 8, eliminates binding and dragging forces on horizontal movement of the side-rails. The brass bushing 36 and linear bearing 20 together create a "floating block" effect.

FIG. 3 is an oblique top perspective view of the described embodiment of the invention, which illustrates a conveyor belt assembly 6 with side-rails 4 and 4' on each side of the conveyor belt. Four support blocks 8 are shown at preselected distances from the side-rails.

Thus, there has been described a device which has decreased considerably the average time taken for accurate adjustment of the side rails of an average lengthed conveyor belt assembly from about 2 hours to about 5 minutes. In this way, the invention contributes to efficient movement of bottles or any other item along the assembly or conveyor line, and an increase in the number of effective work hours and productivity relative to the filling or any comparable process.

Further, in this invention the side-rail units are preferably constructed from materials having inherent flexibility, such as plastic, rubber, aluminum or thin bars of wood or metal, including metal alloys. Thus, excessive outward force on the rails distorts them temporarily, but does not cause buckling and permanent distortion of the line, as discussed above. When the force is removed, the rails regain their shape and normal position without damage. This makes it possible to select different settings for the side-rails at various positions along the line. Moreover, the device is constructed in such a way that at potential stress points, linear bearings and bushings made of brass or other suitable materials are used which allow free rotation and prevent the dragging effect and excessive bowing out of the rails which would occur if these pivot points were not provided.

While this invention is susceptible of embodiment in many different forms, there is shown in the drawings in detail one specific embodiment. This embodiment is merely an example of the principles of the invention and is not intended to limit the invention to the embodiment illustrated.

We claim:

1. A device for adjusting the distance between opposed side rails of a conveyor belt assembly, comprising:

means for accommodating a plurality of pre-selected settings, each setting representing a certain distance of movement of one of said rails, at least two settings having a recess; and means for selecting any one of said settings, said means for selecting being capable of being placed into at least one said setting.

2. A device for adjusting the distance between opposed side rails of a conveyor belt assembly, comprising:

means for accommodating a plurality of pre-selected settings each setting representing a certain distance of movement of one of said rails, wherein said means for accommodating comprises a disc having recesses of different depths at intervals around its perimeter, each said recess being representative of each of said plurality of pre-selected settings; and means for selecting any one of said settings, wherein said means for selecting comprises a setting pole for placement into any one of said recesses so as to secure one of said settings.

3. The device of claim 2 further including support means for supporting said means for accommodating and said means for selecting, and wherein said support means includes a passage opening on two opposed sides, said passage being substantially perpendicular to said side rails, and wherein said device further includes shaft means, said shaft means extending through said passage, at one end being fixedly attached to one of said side rails and at the other end supporting said setting pole, whereby any movement of the setting pole causes corresponding movement of said one of said side rails.

4. The device of claim 3 wherein said support means is a rectangular block.

5. The device of claim 3 wherein said passage includes a linear bearing allowing said shaft means to slide within said support means.

6. The device of claim 3 wherein said means for selecting further includes a compression spring substantially surrounding that portion of said shaft means extending between said support means and said one of said side rails.

7. The device of claim 3 further including holding means for attaching said support means to said conveyor belt assembly, wherein said support means includes a slot for receiving said holding means.

8. The device of claim 7 wherein said slot includes means for facilitating movement of said support means with respect to said holding means.

9. The device of claim 8 wherein said means for facilitating movement comprises a brass bushing.

10. A conveyor belt assembly comprising:

conveyor means for transporting containers of certain sizes;

first and second rail means for guiding said containers along said conveyor means;

adjustment means for adjusting the distance between said first and second rail means, said adjustment means comprising:

means for accommodating a plurality of pre-selected settings, each setting representing a certain distance of movement of one said side rails, at least two settings having a recess; and means for selecting any one of said settings;

said means for selecting being capable of being placed into at least one said setting.

11. A conveyor belt assembly comprising:

conveyor means for transporting containers of certain sizes;

first and second rail means for guiding said containers along said conveyor means;

adjustment means for adjusting the distance between said first and second rail means, said adjustment means comprising:

means for accommodating a plurality of pre-selected settings each setting representing a certain distance of movement of one said side rails, wherein said means for accommodating comprises a disc having recesses of different depths at intervals around its perimeter, each said recess being representative of each of said plurality of pre-selected settings, and means for selecting any one of said settings, wherein said means for selecting comprises a setting pole for placement into any one of said recesses so as to secure one of said settings.

12. The assembly of claim 11 further including support means for supporting said means for accommodating and said means for selecting, wherein said support means includes a passage opening on two opposed sides, said passage being substantially perpendicular to said side rails, and wherein said device further includes shaft means, said shaft means extending through said passage, at one end being fixedly attached to one of said side rails and at the other end supporting said setting pole, whereby any movement of the setting pole causes corresponding movement of one of said side rails.

13. The assembly of claim 12 wherein said passage includes a linear bearing allowing said shaft means to slide within said support means.

14. The assembly of claim 13 wherein said means for selecting further includes a spring substantially surrounding that portion of said shaft means extending between said support means and said one of said side rails.

15. The assembly of claim 14 further including holding means for attaching said support means to said conveyor belt assembly, wherein said support means includes a slot for receiving said holding means.

16. The assembly of claim 15, wherein said slot includes means for facilitating movement of said support means with respect to said holding means.

17. The assembly of claim 16, wherein said means for facilitating movement comprises a brass bushing.

18. In a conveyor belt assembly having a conveyor belt for transporting items of different shapes and sizes between first and second side rails, an adjustment device comprising:

means for accommodating a plurality of pre-selected settings each setting representing a certain distance of movement of one of said side rails;

means for selecting any one of said settings;

wherein said means for accommodating comprises a disc having recesses of different depths at intervals around its parameter, each said recess being representative of each of said plurality of settings, and wherein said means for selecting comprises a setting pole for placement into any one of said recesses so as to secure one of said settings; and wherein said support means includes a passage opening on two opposed sides, said passage being substantially perpendicular to said side rails, and wherein said device further includes shaft means, said shaft means extending through said passage, at one end being fixedly attached to one of said side rails and at the other end supporting said setting pole, whereby any movement of the setting pole causes corresponding movement of one of said side rails.

19. The adjustment device of claim 18 wherein said passage includes a linear bearing allowing said shaft means to slide within said support means, wherein said means for selecting further includes a spring substantially surrounding that portion of said shaft means extending between said support means and one of said side rails, and further including holding means for attaching said support means to said conveyor belt assembly, wherein said support means includes a slot for receiving said holding means and a brass bushing for facilitating movement of said support means with respect to said holding means.

20. A device for adjusting opposed side rails of a conveyor belt assembly including a conveyor belt, comprising:

horizontal adjustment means for adjusting the distance between said opposed side rails, including means for accommodating a plurality of pre-selected settings each setting representing a certain distance of movement of one of said rails, and means for selecting any one of said settings; and vertical adjustment means for adjusting the height of at least one of said side rails, including second means for accommodating a second plurality of pre-selected settings, each second setting representing a certain height of one of said side rails above the conveyor belt, and second means for selecting any one of said second settings;

wherein said second means for accommodating comprises a vertical rod supporting said horizontal adjustment means, said rod having receptacles at different locations along its length, each said receptacle being representative of each of said second plurality of pre-selected settings, and wherein said second means for selecting comprises a setting knob for placement into any one of said receptacles so as to secure one of said second settings, whereby said first and second pre-selected settings allow for quick and predictable adjustment of said side rails to previously used or desirable positions.

* * * * *

UNITED STATES PATENT AND TRADEMARK OFFICE
CERTIFICATE OF CORRECTION

PATENT NO. : 5,322,160

DATED : June 21, 1994

INVENTOR(S) : Markiewicz et al.

It is certified that error appears in the above-indentified patent and that said Letters Patent is hereby corrected as shown below:

Column 5, line 1, "holes," should read -- holes 33, --.

Signed and Sealed this

First Day of November, 1994

Attest:

Attesting Officer

BRUCE LEHMAN

Commissioner of Patents and Trademarks